Patented Nov. 12, 1929

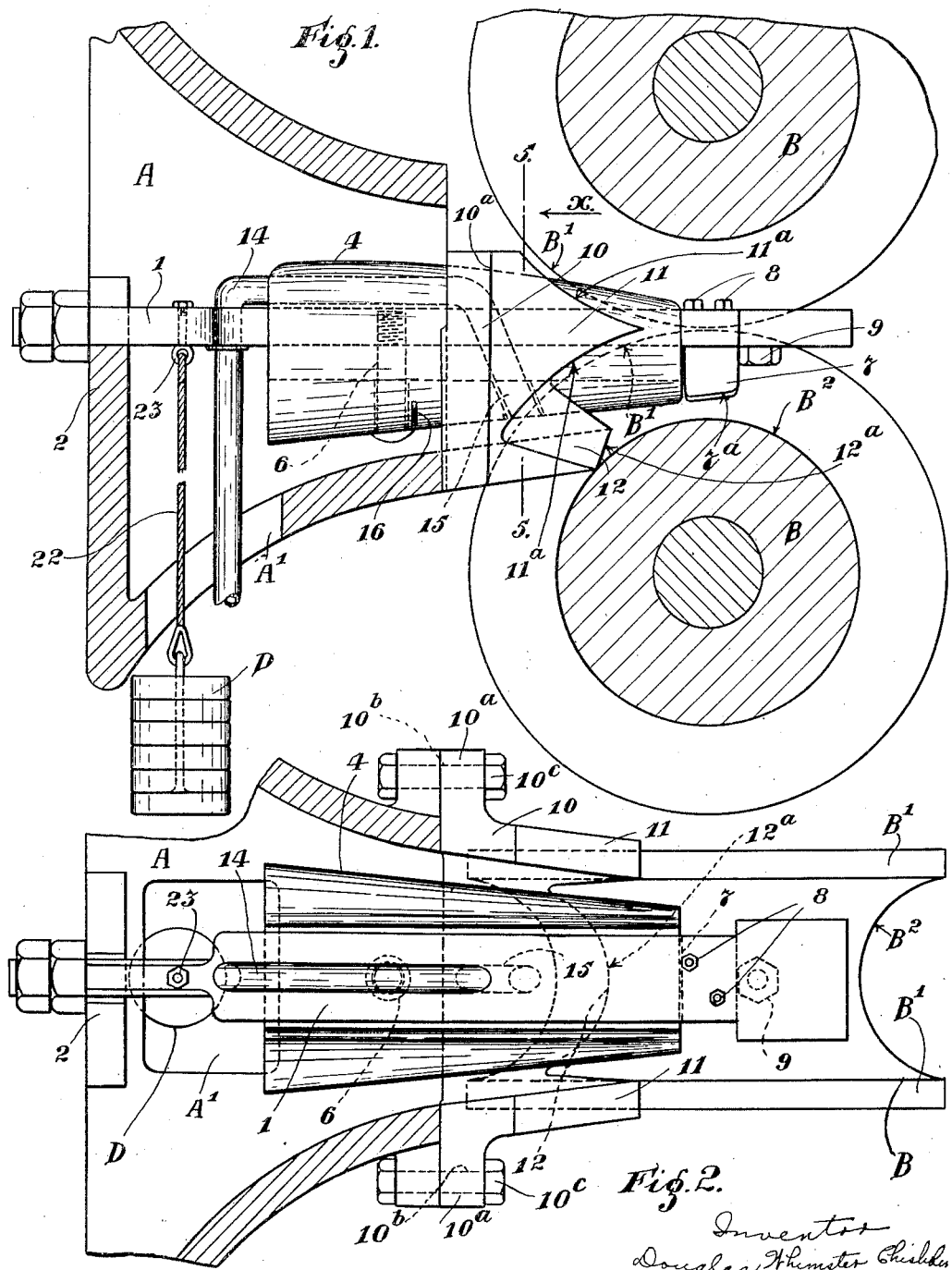

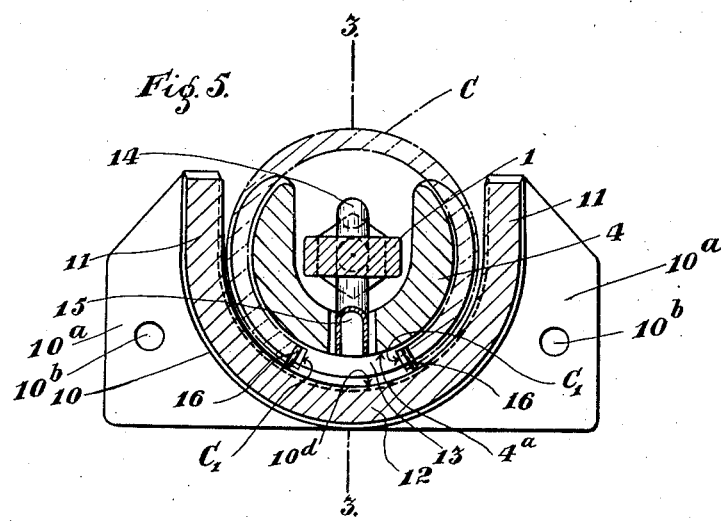
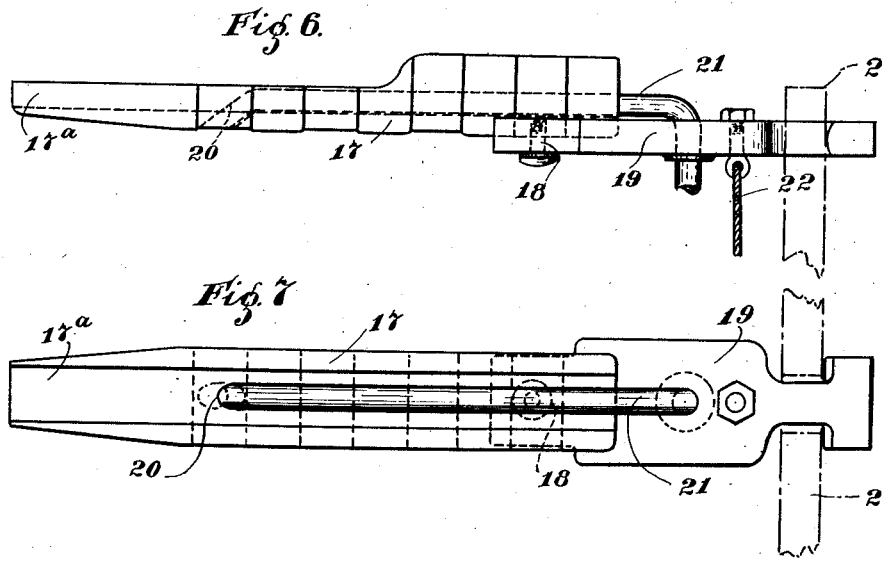
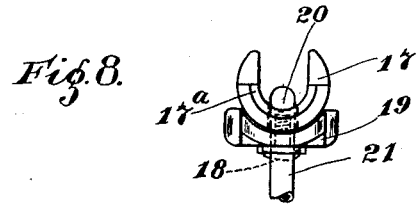

1,735,234

UNITED STATES PATENT OFFICE

DOUGLAS WHIMSTER CHISHOLM, OF GLASGOW, SCOTLAND, ASSIGNOR TO THE BIRCHFIELD ENGINEERING COMPANY LIMITED, OF CARDIFF, WALES

MANUFACTURE OF BUTT-WELDED TUBES

Application filed April 29, 1926, Serial No. 105,407, and in Great Britain February 2, 1926.

This invention relates to the manufacture of welded tubes by the process in which a heated metal strip is drawn through a bell or die, and the edges of the strip, after being heated to a welding temperature by oxygen or other suitable welding gas, are pressed together and welded by the action of rolls.

According to the present invention the edges of the strip are held and supported at the exterior and interior thereof just before entering the rolls and while being so supported are acted on by welding gas. In carrying out the invention I provide, firstly, a movable mandrel adapted to press on the interior of the edges of the skelped strip before the same enters the closing rolls, and, secondly, a guide adapted to support the exterior of the edges of the strip at the same time as the interior thereof is being acted on by the mandrel, oxygen or other welding gas being supplied to the pocket formed by and between the outer surface of the mandrel, the inner surface of the guide, and the contiguous edges of the strip. In this way the edges of the strip are supported and are also passed, as it were, through a bath of welding gas just before being acted on by the rolls.

The said mandrel may be adapted to press also on the interior of the edges of the skelped strip as the same is actually passing through the rolls or may be combined with a second mandrel adapted to so function. In each case the pressure may be regulated and maintained by means of an adjustable or interchangeable weight or the equivalent thereof acting on the mandrel.

In order that my invention may be clearly understood reference will now be made, by way of example, to the accompanying drawings, in which:—

Fig. 1 is a side elevation of one embodiment of the invention, the bell or die (partly broken away and being shown in section) and the closing rolls being indicated by chain dotted lines;

Fig. 2 is a plan view corresponding to Fig. 1;

Fig. 5 is a section in the plane of the line 3—3 (Fig. 1) looking in the direction of the arrow $x$;

Fig. 6 is a side elevation of a modified form of mandrel;

Fig. 7 is a plan view corresponding to Fig. 6; and

Fig. 8 is a view of the same mandrel looking from the left of Fig. 6.

Figure 3:
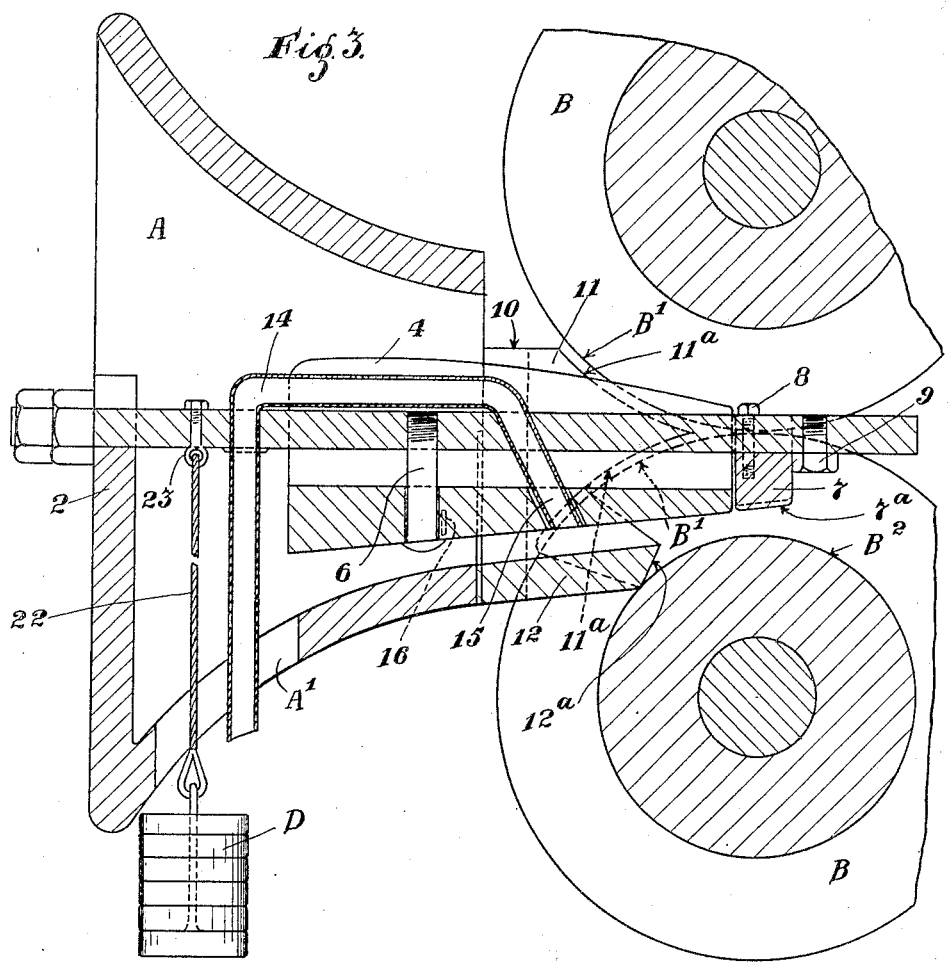
Fig. 3 is a longitudinal section.
Figure 4:
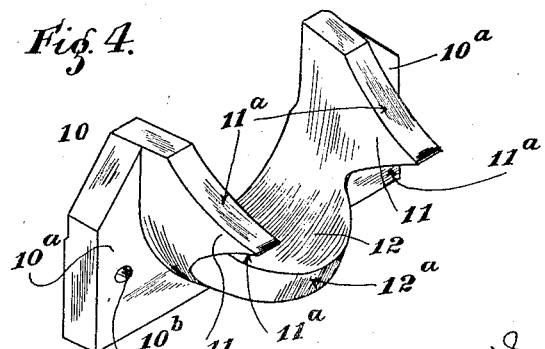
Fig. 4 is a detail view of the member 10;

Referring to Figs. 1 to 5 of the drawings where A is the bell, B the rolls and C (Fig. 5) the skelped strip, it will be seen that a long flat bar 1 is loosely supported at one end by an upward projection 2 in the flared end of the welding bell or die A, the heated strip being drawn through the bell or die A, edges downward, so that the strip is not obstructed by the projection 2. To the bar 1 a tapering and channelled mandrel 4 is loosely attached, the said mandrel having substantially the form of a U shaped sleeve. The mandrel 4 is supported from the bar 1, as shown, by means of a bolt 6 secured to the underside of the said bar. Adjacent to the smaller end of the said mandrel, a second mandrel 7 is fitted to the bar, this mandrel consisting of a solid metal block curved convexly at the lower surface $7^a$ thereof and rigidly attached by means of bolts 8 to the bar 1. A stop 9 is arranged on the underside of the bar 1 in advance of the said mandrel 7 so as to prevent the same being shifted or loosened by the frictional action of the interior edges of the skelped strip.

To the constricted end of the bell or die A, a guide member 10 is attached. This guide member is shown in detail in Fig. 4, from which it will be seen to comprise a pair of spaced vertical jaws 11 and a concave bridge 12 connecting the said jaws 11 together at the bottom thereof. The jaws 11 and the bridge 12 are of converging shape and are formed integral with a supporting flange $10^a$ provided with bolt holes $10^b$ through which are passed bolts $10^c$ (Fig. 2) by which the whole guide member is held in place on the bell or die A. The edges of the jaws 11 are made of concave, tapering, shape as shown at $11^a$, so as to correspond with the contiguous peripheral surfaces $B^1$ (see Figs. 1 and 3) of the rolls B. In addition, the front of the bridge 12 is chamfered and rounded off as shown at 12ª so as to fit closely up to the semi-circular periphery B² of the lower roll.

As the guide member quickly becomes heated, it is preferable that it should be bolted to the bell or die as aforesaid for quick removal and replacement. The guide member forms a removable continuation of the bell or die A, whereby the exterior of the edges of the skelped strip are supported right up to the pass of the rolls B, and the strip edges are subjected to a prolonged action of the welding gas before the edges are closed by the closing rolls.

Between the convex outer surface 4ª (Fig. 5) of the mandrel 4 and the concave inner surface 10ᵈ of the guide member 10, a partial annulus or pocket 13 is formed, which, in practice, is bounded at the sides by the adjacent edges $C_1$ of the skelped strip C (see Fig. 5). Into this partial annulus or pocket 13 the welding gas is supplied (from a suitable source) by a pipe 14 which passes along the upper side of the bar 1 to a nozzle 15 projecting downwardly through the bar 1 and mandrel 4. The gas as it issues from the nozzle 15 is deflected by the concave inner surface 10ᵈ of the guide member 10 on to the edges $C_1$ of the skelped strip C. To space the mandrel 4 away from the guide member 10, a pair of small projecting pins 16 may be fitted to the under surface 4ª of the mandrel 4 in advance of the nozzle 15. As will be seen the bar 1 lies snugly in the channel at the upper side of the mandrel 4.

In the modification shown in Figs. 6 and 8, a long mandrel 17 of channelled and slightly tapering semi-cylindrical form is loosely mounted by means of a bolt 18 on one end of a bar 19 corresponding to the bar 1 but shorter. In practice the bar 19 is so hinged at its other end to a support such as 2 carried by the relative welding bell or die that the mandrel projects forwardly at its left end (the position of the mandrel being reversed in these views) through the said bell or die and extends into the passage between the closing rolls, the toe 17ª of the mandrel 17 passing on to the interior edges of the skelped strip as the same passes through the said rolls. As in the previously described form of mandrel, a nozzle 20 and pipe 21 for the supply of welding gas to the edges of the heated strip are provided, the said pipe 21 passing upwardly through the bar 19 and thence along the inside of the mandrel 17 to the nozzle 20. The action of the gas is similar to that already described, a guide member of the kind previously specified being again provided.

In each of the described forms of mandrel (4 and 7, or 17) the pressure on the interior of the edges of the strip passing through the closing rolls may be regulated and maintained by means of interchangeable weights D suspended by means of a carrier and rope 22 attached to a bolt 23 carried by the bar (1 or 19) aforesaid, an opening (such as $A_1$ in Figs. 1 and 2) being provided in the lower part of the welding bell or die A to accommodate the said carrier and rope 22.

If preferred, the bar carrying the mandrel may be mounted in such a manner as to give the necessary pressure without the application of a weight, equivalent means, such as a spring being used in lieu of a weight.

The strip to be skelped and welded is drawn through the bell or die in well known manner the strip passing on at the upper side of the bell or die and being bent downwards so that its edges pass under the mandrel 4 into the space between it and the bottom of the bell or die and of the guide 10. The guide forms a removable extension of the ball or die and supports the edges of the strip up to the pass of the rolls B.

The welding gas, from bottles or other source of supply, enters the space between the edges and acts thereon at a time just before the pressure of the rolls takes place. The edges are positively supported both inside and out so that they cannot buckle, bend, or collapse, when being acted on by the gas. It will be seen that the additional mandrel 7 is right in the pass of the rolls, thereby ensuring effective closure of the edges.

It will be obvious that with the means hereinbefore set forth a much more efficient welding action than hitherto is possible, the gas being applied to the edges of the skelped strip in such a manner that every part of each edge is heated to the required welding temperature and is kept so heated up to the actual closing and welding operation. The said means also achieves a marked saving in the gas supplied, for all the heat therefrom is conserved within the pocket formed as aforesaid, and gas is not allowed to escape without acting on the abutting edges of the strip.

Having now fully described my invention what I claim and desire to secure by Letters Patent is:—

1. In the manufacture of welded tubes from metal strips, the combination with a skelping die and closing rolls of means adapted to provide supporting surfaces for supporting the exterior and interior of the edges of the strip as it passes from the die to the rolls, and means whereby welding gas is introduced into the space between the said supporting surfaces at a point intermediate to the ends thereof and is confined by the said surfaces so as to form a bath of welding gas for the edges of the strip.

2. In the manufacture of welded tubes from metal strips, the combination with a skelping die and closing rolls of means adapted to provide supporting surfaces for supporting the exterior and interior of the edges of the strip as it passes from the die to the rolls, means whereby welding gas is introduced into the space between the said supporting surfaces at a point intermediate to the ends thereof and is confined by the said surfaces so as to form a bath of welding gas for the edges of the strip, and means adapted to be pressed positively on the interior of the edges of the skelped strip as said strip is passing through the said rolls.

3. In the manufacture of welded tubes from metal strips, the combination with a skelping die and closing rolls of means adapted to provide supporting surfaces for supporting the exterior and interior of the edges of the strip as it passes from the die to the rolls, means whereby welding gas is introduced into the space between the said supporting surfaces at a point intermediate to the ends thereof and is confined by the said surfaces so as to form a bath of welding gas for the edges of the strip, means adapted to be pressed positively on the interior of the edges of the skelped strip as said strip is passing through the said rolls, and means whereby the positive pressure of the last mentioned means on the interior of the said edges may be regulated and maintained.

4. In the manufacture of welded tubes from metal strips the combination with a skelping die and closing rolls of a guide adapted to support the exterior of the edges of the strip as it passes from the die to the rolls, means whereby the said guide is removably secured to the said die, a mandrel adapted to support the interior of the edges of the strip as it passes from the die to the rolls, means to carry the said mandrel so that it is self-adjustable with respect to the said guide, and means whereby welding gas is introduced into the space between the said mandrel and guide at a point intermediate to the ends thereof and is confined thereby so as to form a bath of welding gas for the edges of the strip.

5. In the manufacture of welded tubes for metal strips the combination with a skelping die and closing roll of a guide adapted to support the exterior of the edges of the strip as it passes from the die to the rolls, means whereby the said guide is removably secured to the said die, a mandrel adapted to support the interior of the edges of the strip as it passes from the die to the rolls, means to carry the said mandrel so that it is self-adjustable with respect to the said guide, means whereby welding gas is introduced into the space between the said mandrel and guide at a point intermediate to the ends thereof and is confined thereby so as to form a bath of welding gas for the edges of the strip, and a second mandrel adapted to be pressed positively on the interior of the edges of the skelped strip as said strip is passed through the said rolls.

6. In the manufacture of welded tubes from metal strips the combination with a skelping die and closing rolls of a guide adapted to support the exterior of the edges of the strip as it passes from the die to the rolls, means whereby the said guide is removably secured to the said die, a mandrel adapted to support the interior of the edges of the strip as it passes from the die to the rolls, a bar extending through the said die and rolls above said mandrel, means in the flared end of the said die for pivotally supporting the said bar, means whereby the said mandrel is loosely attached to the said bar, and means whereby welding gas is introduced into the space between the said mandrel and guide at a point intermediate to the ends thereof and is confined thereby so as to form a bath of welding gas for the edges of the strip.

7. In the manufacture of welded tubes from metal strips the combination with a skelping die and closing rolls of a guide member consisting of a pair of spaced vertical jaws with cusp-shaped edges and a concave bridge connecting the said jaws together at the bottom thereof, the said guide being adapted to support the exterior of the edges of the strip as it passes from the die to the rolls, means whereby the said guide is removably secured to the said die, a mandrel adapted to support the interior of the edges of the strip as it passes from the die to the rolls, means to carry the said mandrel so that it is self-adjustable with respect to the said guide, and means whereby welding gas is introduced into the space between the said mandrel and guide at a point intermediate to the ends thereof and is confined thereby so as to form a bath of welding gas for the edges of the strip.

8. In the manufacture of welded tubes from metal strips the combination with a skelping die and closing rolls of a guide adapted to support the exterior of the edges of the strip as it passes from the die to the rolls, means whereby the said guide is removably secured to the said die, a mandrel adapted to support the interior of the edges of the strip as it passes from the die to the rolls, a bar extending through the said die and rolls above the said mandrel, means in the flared end of the said die for pivotally supporting the said bar, means whereby the said mandrel is loosely attached to the said bar, a second mandrel consisting of a solid metal block curved convexly on the lower surface thereof, means for rigidly securing the last mentioned mandrel to the said bar in advance of the first mentioned mandrel, and means whereby welding gas is introduced into the space between the said mandrel and guide at a point intermediate to the ends thereof and is confined thereby so as to form a bath of welding gas for the edges of the strip.

9. In the manufacture of welded tubes from metal strips the combination with a skelping die and closing rolls of a guide adapted to support the exterior of the edges of the strip as it passes from the die to the rolls, means whereby the said guide is removably secured to the said die, a mandrel having substantially the shape of a sleeve formed with a longitudinal slot of deep U-section and adapted to support the interior of the edges of the strip as it passes from the die to the rolls, a bar extending through the said die and rolls above the said mandrel, means in the flared end of the said die for pivotally supporting the said bar, means whereby the said mandrel is loosely attached to the said bar, a second mandrel consisting of a solid metal block curved convexly on the lower surface thereof, means for rigidly securing the last mentioned mandrel to the said bar in advance of the first mentioned mandrel, a stop arranged on the underside of the said bar to prevent the rigidly secured mandrel being loosened, and means whereby welding gas is introduced into the space between the said mandrel and guide at a point intermediate to the ends thereof and is confined thereby so as to form a bath of welding gas for the edges of the strip.

10. In the manufacture of welded tubes from metal strips the combination with a skelping die and closing rolls of a guide adapted to support the exterior of the edges of the strip as it passes from the die to the rolls, means whereby the said guide is removably secured to the said die, a mandrel adapted to support the interior of the edges of the strip as it passes from the die to the rolls, means to carry the said mandrel so that it is self-adjustable with respect to the said guide, and means comprising a nozzle projecting downwardly through the said bar and mandrel and a connecting pipe running along the upper side of the said bar whereby welding gas is introduced into the space between the said mandrel and guide at a point intermediate to the ends thereof and is confined thereby so as to form a bath of welding gas for the edges of the strip.

11. In the manufacture of welded tubes from metal strips, in combination with skelping means and closing rolls, of a guide extension on said skelping means having spaced jaws with cusp-shaped edges, means for supporting said extension so that said cusp-shaped edges extend right up to the pass between said rolls, and means whereby welding gas is supplied to the edges of the strip in advance of said rolls.

12. In a gas welding apparatus for butt-welding tubes, the combination of skelping means for bending a blank into tubular form with a gap between its edges, means for closing the edges of the skelped blank, a replaceable semi-tubular open top skelp guide for exteriorly supporting the edges of the skelped blank on the bottom of the guide and between the skelping means and the edge closing means, whereby the said guide exteriorly bridges the gap and this together with the bent blank and spaced edges thereof defines a chamber, and means for introducing welding gas into the said chamber and between the edges of the skelp.

13. In an apparatus for gas welding tubes, a bell-shaped die having a mandrel support extending radially inward from one of its walls, a mandrel carried by the support and extending axially of the die and projecting at the exit end thereof, a replaceable skelp guide constituting a continuation of the exit end of the die for supporting the edges of the skelped blank, a gas pipe entering thru one of the walls of the die in alignment with the mandrel support and having a branch extending along the mandrel and then transversely thru the mandrel, the open discharge end of the gas pipe being disposed to discharge into the space between the mandrel and the guide and in alignment with the mandrel support, and means at the exit end of the skelp guide for closing the edges of the skelped blank.

In testimony whereof I affix my signature.

DOUGLAS WHIMSTER CHISHOLM.